United States Patent
Sun et al.

(10) Patent No.: US 10,262,155 B1
(45) Date of Patent: Apr. 16, 2019

(54) DISABLING FEATURES USING FEATURE TOGGLE

(71) Applicant: EMC Corporation, Hopkinton, MA (US)

(72) Inventors: Hao Sun, Shanghai (CN); Jim Pendergraft, Raleigh, NC (US); Jichao Zhang, Shanghai (CN); Link Yu, Shanghai (CN); Wei Wang, Westborough, MS (US); Nicholas Wei, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 14/755,653

(22) Filed: Jun. 30, 2015

(51) Int. Cl.
*G06F 21/00* (2013.01)
*G06F 21/62* (2013.01)

(52) U.S. Cl.
CPC .... *G06F 21/629* (2013.01); *G06F 2221/0768* (2013.01)

(58) Field of Classification Search
CPC ........ G06F 21/00; G06F 21/10; G06F 21/121; G06F 21/125; G06F 21/128; H04N 21/44236; G11B 20/00086
See application file for complete search history.

(56) References Cited

U.S. PATENT DOCUMENTS

| | | | |
|---|---|---|---|
| 2007/0078905 A1* | 4/2007 | Gunther | G06F 9/542 |
| 2008/0070593 A1* | 3/2008 | Altman | H04W 4/029 455/457 |
| 2010/0318629 A1* | 12/2010 | Smith | G06F 21/128 709/217 |
| 2016/0063282 A1* | 3/2016 | Shani | G06F 9/06 717/121 |

FOREIGN PATENT DOCUMENTS

EP    2608487 A1    6/2013

OTHER PUBLICATIONS

James, Paul, "A RESTful Web service, an example", Oct. 30, 2005, Retrieved at «http://www.peej.co.uk/articles/restfully-delicious.

* cited by examiner

*Primary Examiner* — Brandon S Hoffman
*Assistant Examiner* — Helai Salehi
(74) *Attorney, Agent, or Firm* — BrainwoodHuang

(57) ABSTRACT

Examples are generally directed towards disabling features using a feature toggle associated with an application programming interface (API). A server receives an API request including one or more elements. An element is associated with a set of features. If a feature state of every feature within the set of features is an enabled feature state, the element state is an enabled element state and the request is validated. The validated request is executed and a response to the request is returned to the client. If at least one feature state of at least one feature within the set of features is a disabled feature state or a hidden feature state, the element state is a disabled element state and the request is invalided. The invalidated request is rejected and an error message is returned to the client.

18 Claims, 6 Drawing Sheets

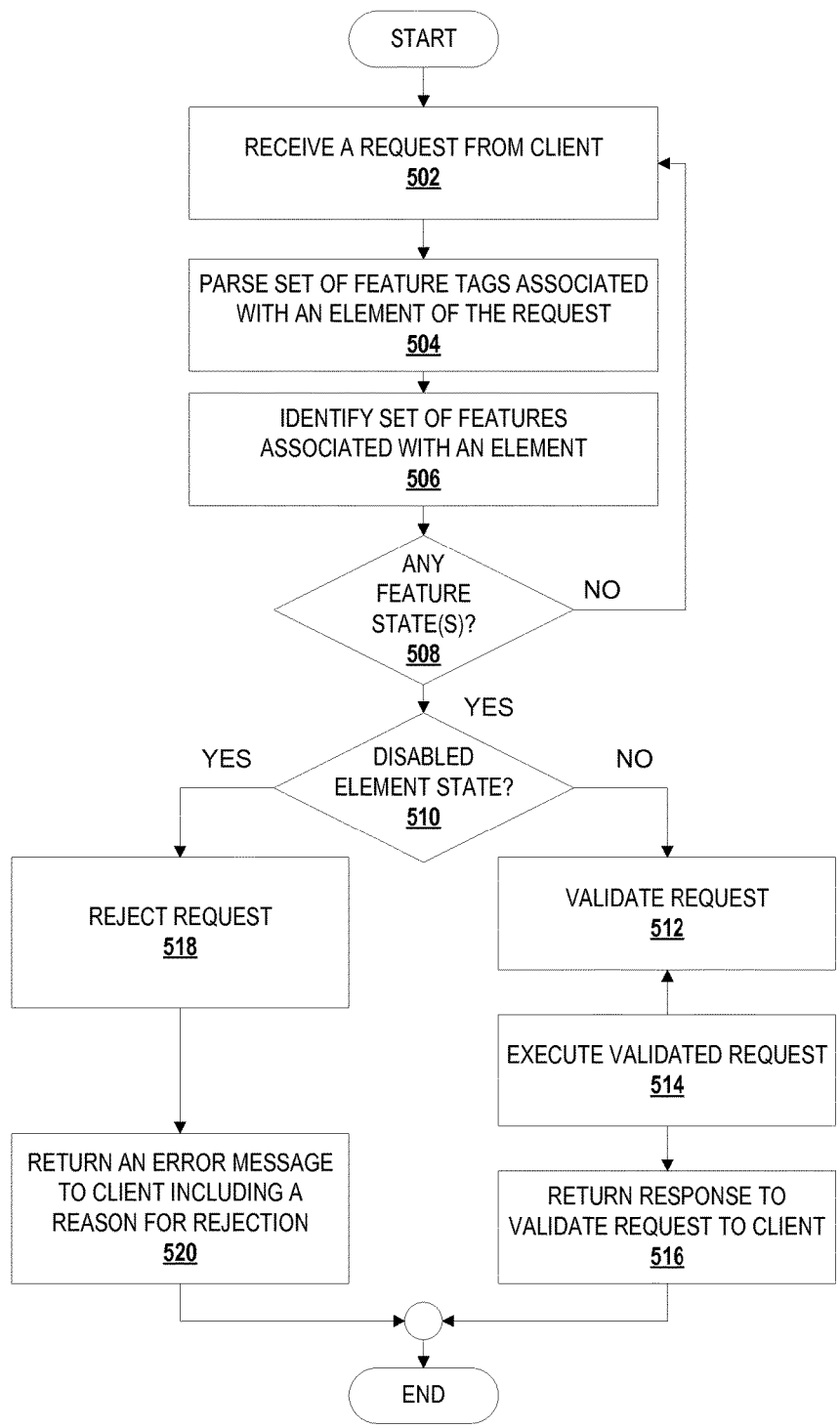

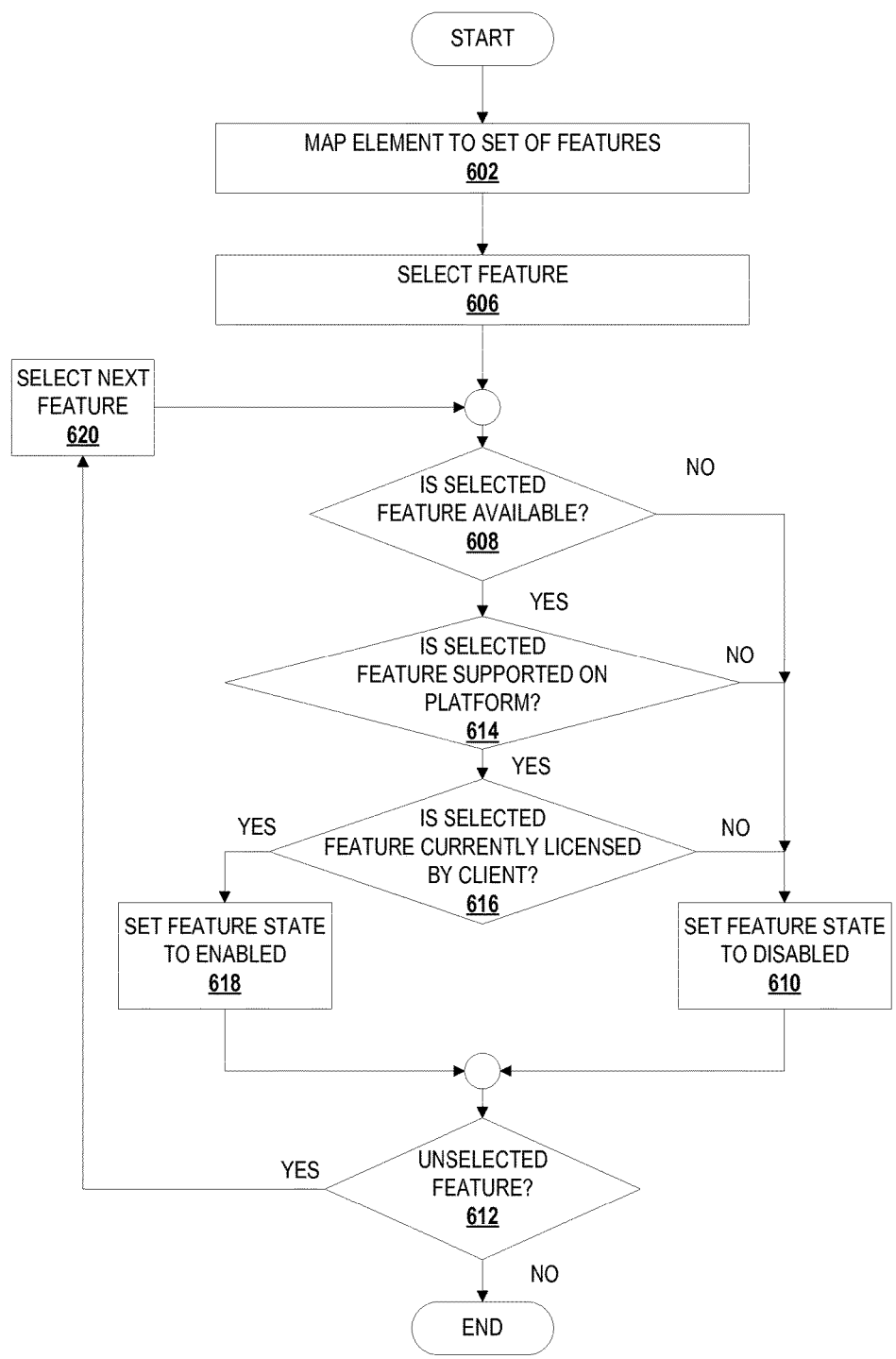

US 10,262,155 B1

DISABLING FEATURES USING FEATURE TOGGLE

BACKGROUND

A representational state transfer (REST) application programming interface (API) is a software architecture style associated with a client-server model. In a REST API each element type on a server may be represented by a uniform resource locator (URL). Requests are sent from a client to the server using hypertext transfer protocol (HTTP) using HTTP verbs such as, GET, POST, PUT, and DELETE. These HTTP verbs may be used to read, post, delete, and update data to a server.

A REST API provides many advantages over other more restrictive architectural styles, such as simple object access protocol (SOAP). For example, a REST API enables users to expose existing functionality in a programmable way, such as exposing an existing API as a web service. Enabling clients to view the code for APIs is sometimes desirable because it enables customers to integrate APIs into automation workflow with greater ease.

In at least some existing systems, functionality supported by a REST API is exposed to all clients. This is problematic because not all features should be exposed to all clients. For example, some features may not be licensed by a particular user. In addition, there may be multiple different platforms of a given storage system release. Some features may not be supported by a particular product instantiation platform or packaging. A developer or product team may also wish to hide some immature features which are still under development.

SUMMARY

Examples of the disclosure provide for disabling and enabling application programming interface (API) features. In an example, a computer-implemented method executed by one or more processors is provided. A set of feature tags associated with an element of an application programming interface (API) request is parsed. A set of features associated with the element is identified based on the set of feature tags, by the one or more processors. An element state of the element is determined based on at least one feature state corresponding to at least one feature from the set of features. The element state includes an enabled element state or a disabled element state. The request is rejected on determining the element state is the disabled element state to form a rejected request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWING

FIG. 5 is a flow chart illustrating operation of a computing device to process requests based on element states.

FIG. 6 is a flow chart illustrating an operation for determining a feature state of at least one feature.

Corresponding reference characters indicate corresponding parts throughout the drawings.

DETAILED DESCRIPTION

Figure 1:
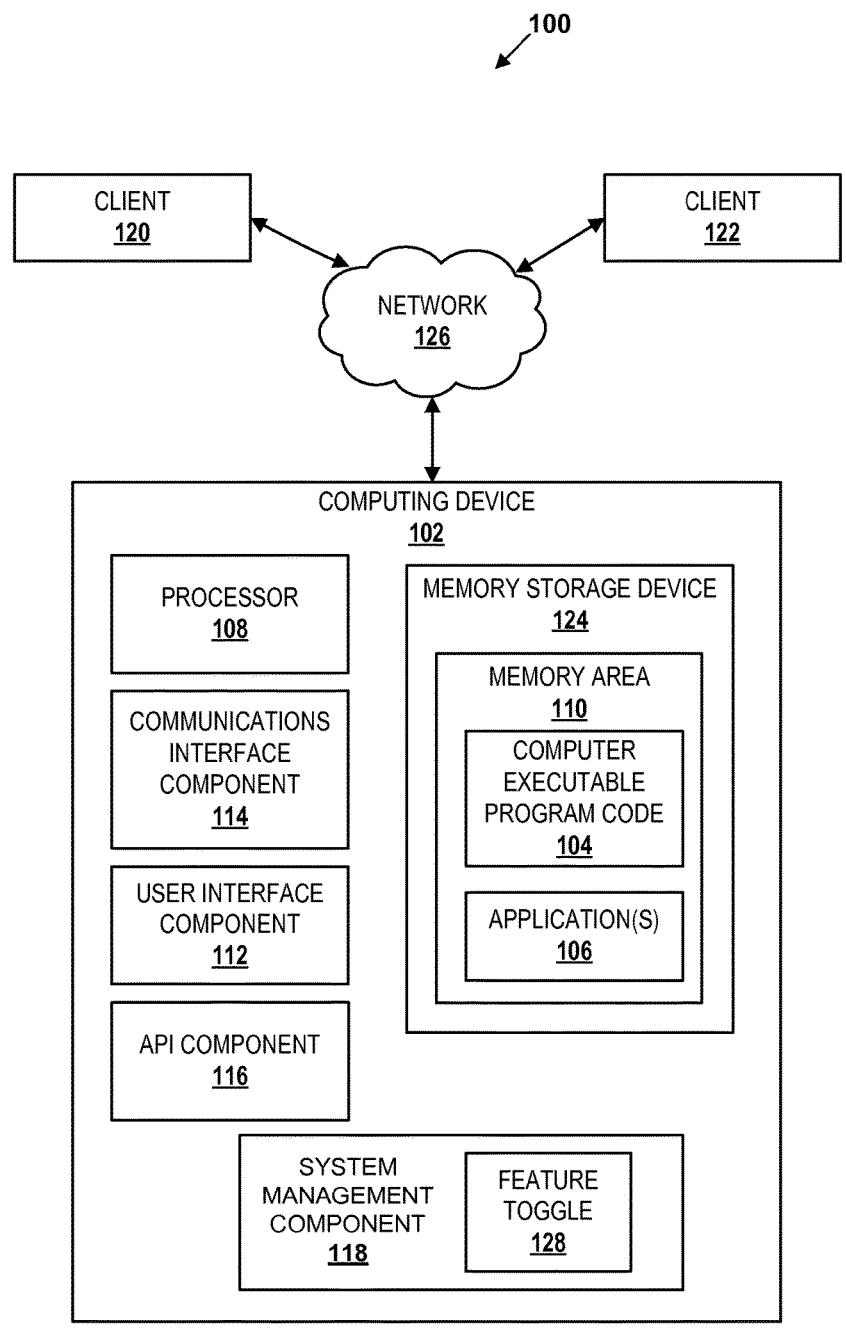
FIG. 1 is an exemplary block diagram illustrating a computing system for responding to client requests.

Examples of the disclosure enable a feature toggle for enabling and disabling specific features associated with an application programming interface (API). Aspects of the disclosure provide a data storage system. The system may support a large number of different elements and their corresponding features. In some aspects of the disclosure, an element of a request may include resource types, properties, methods (or functions), and method arguments. A feature may include an application, operation, or other function associated with one or more application programming interfaces (APIs), such as a representation state (REST) API.

Other aspects provide a feature toggle capability for an API to map an association between elements and features. At build time, a developer maps a set of one or more features to each element in a plurality of elements associated with a computing system. This enables developers to map elements to features in the code. The feature toggle component improves the computer hardware and software development process by supporting feature team to change and/or plan the feature availability at any time of the agile development cycle. This further improves developer efficiency and experience developing and modifying features and feature availability. The feature toggle further enables a developer to control whether an individual feature is made available in a particular release at build time or made available to a particular client at runtime.

Aspects of the disclosure provide a feature toggle that parses a set of feature tags to identify a set of features associated with a given element. A feature tag identifies a feature mapped to or associated with an element. The feature toggle determines a current state of each feature in the set of features during runtime. The current state of each feature in the set of features is looked up in the system. The state of a given feature may be enabled, disabled, or hidden. The feature toggle checks hardware capabilities, software version capabilities, feature licenses, and black content to determine whether a given feature is enabled, disabled, or hidden. The feature state is dynamic and determined by the feature toggle component when needed. Thus, the feature toggle dynamically determines whether a given feature state is enabled, disabled, or hidden.

For example, a feature may be disabled with regard to a particular user because the feature is not currently licensed by that particular user. In other cases, a feature may be disabled with regard to a particular system platform because that platform does not support that feature. In still other examples, some features may be immature features that are still under development and not ready for release or utilization by clients. These features may be referred to as black content. Features associated with black content may have a hidden feature state.

In some aspects of the disclosure, an element is assigned an enabled element state if all the features in a set of features required by the element are enabled. If one or more required features are disabled or hidden, the element is assigned a disabled element state. A disabled element is unavailable or cannot be made available to the client for one or more reasons, such as an unlicensed feature, a feature not supported by a storage system platform, an immature feature still under development, or otherwise unavailable feature.

Aspects of the disclosure enable an early validation on element state. Each feature has an associated feature state. In some examples, one or more features may always be enabled. In these examples, an element in a plurality of elements associated with a permanently enabled. If every feature associated with a given element is a permanently enabled feature, the element is also a permanently enabled feature that is always enabled. In other examples, the state of one or more features is dynamically determined during runtime.

If all the feature states associated with an element are enabled, the element state is enabled. If all the elements associated with a request are enabled, the request is validated. A validated request is passed through the API stack for processing to generate a response to the validated request. However, if one or more feature states of a feature from a set of features mapped to a given element is disabled or hidden, the state of the given element is disabled. If the element state is disabled, the request is invalidated and the request is rejected.

This aspect enables immediate rejection of a request that should not be processed because one or more features associated with the request are unavailable. A feature may be unavailable if the feature is unsupported on a platform, unlicensed, or is associated with black content. This preliminary validation prevents invalid requests from being processed and consuming system resources by identifying and rejecting invalid requests before the invalid requests are passed farther down the API stack. The early validation also reduces response time because requests associated with unavailable features are rejected more quickly.

Aspects of the disclosure return an error message to a client in response to rejecting a request during the early validation. The error message informs the client more rapidly of the inability of the system to perform the requested operations. Preventing execution of invalid request also decreases processor load, conserves memory, increases processing speed of valid requests by reducing the number of total requests processed, and the reduces error rate by rejecting requests that cannot be performed. Thus, early validation on feature state reduces the overall cost of system resources.

In still other aspects, when a request is invalidated an error message including a reason the request was rejected is returned to the client. This error message identifies the reason the request was rejected. This error message with the reason for invalidation enables the user to correct the problem more quickly and efficiently to enable the next such request to be validated and processed to a successful conclusion. This information improves user efficiency and user interaction with the system.

Other aspects of the disclosure provide hidden feature states which permit the server or other computing device to hide functionalities associated with black content from users. The API exposes functionalities associated with all available features to the client. Black content associated with immature features still under development or features that the developer has decided not to make available to clients for one or more reasons is identified as black content using the hidden features state. Hidden features are neither visible nor available to clients. If a client request is associated with a hidden feature, the feature toggle returns an error. In some examples, attempts to use hidden features results in the same error a client would get if the element name is misspelled in a request. This hidden feature state also improves security by providing additional layer of protection for black content.

Still other aspects of the disclosure provide types-feed queries with feature toggle to enable a quick and efficient method by which a user may obtain a list of all available properties supported by a computing device platform and currently licensed for utilization in generating API queries associated with a particular resource. Hidden elements associated with hidden feature states are not identified to users in queries, such as these types-feed queries. This encourages users to utilize supported fields in a current version of a resource which saves memory, improves performance of the input/output operation, and improves compatibility between different API versions while hiding black content that should not be exposed to clients.

Other aspects of the disclosure improve user experience when calling REST API by shortening query response time, improving user interaction performance, returning only available properties to the user, and improving user efficiency by minimizing the number of properties associated with unavailable features returned to the user in each query response the user receives from a server.

Aspects of the invention contemplate a centralized control within a REST API to limit or select which features are exposed to clients. In some examples, the toggle feature permits a developer to map an element to a set of features within a system platform at build time. In other words, tagging a set of features to an element at build time enables the developer to turn an element on or off at the feature level. The user does not have to manually edit code associated with APIs as a given platform changes, to accommodate new platforms, or to conform to changes in features or feature content. Instead, features are toggled on or off to dynamically and flexibly accommodate changes to platforms, license agreements, feature content, and so forth.

In other examples, the toggle feature also enables APIs associated with black content to be hidden and rendered inaccessible to clients. This prevents developers from having to edit API code or delete code to accommodate changes in feature and/or element availability.

Referring again to FIG. 1, an exemplary block diagram illustrates a computing system 100 for responding to client requests. In the example of FIG. 1, a system 100 for responding to API queries received from one or more clients is shown. The system 100 includes a server-client network. However, aspects of the disclosure are not limited to networked systems.

A computing device 102 may be any type of computing device, such as, but not limited to, a server. The computing device 102 may include a web server, an application server, a file server, a back-end server, a cloud server, storage array, storage system, or any other type of computing device. In another example, the computing device 102 is associated with a data storage system. In still another example, the computing device 102 may be any type of server for request processing. In yet another example, computing device 102 may represent a group of processing units or group of networked computing devices.

The computing device 102 executes the computer executable program code 104 (e.g., as application(s) 106, operating system functionality, or both) to implement the operations and functionality associated with the computing device 102.

In some examples, the computing device 102 includes at least one processor 108, a memory area 110 associated with a memory storage device 124, and at least one user interface component 112. The processor 108 includes any quantity of processing units and is programmed to execute the computer executable program code 104 for implementing aspects of the disclosure.

The computer executable program code 104 may be performed by the processor 108 or by multiple processors within the computing device 102, or performed by a processor external to the computing device 102. In some examples, the processor 108 is programmed to execute the computer executable program code 104 such as those illustrated in the figures (e.g., FIG. 5 and FIG. 6).

The computing device 102 further has one or more computer readable media such as the memory area 110. The memory area 110 includes any quantity of media associated with or accessible by the computing device 102. The memory area 110 may be internal to the computing device 102 (as shown in FIG. 1), external to the server (not shown), or both (not shown). In some examples, the memory area 110 includes read-only memory (ROM) and/or memory wired into a computing device.

The memory area 110 stores, among other data, the computer executable program code 104 and the one or more application(s) 106. The application(s) 106, when executed by the processor 108, operate to perform functionality on the computing device 102. Exemplary application(s) 106 include, without limitation, mail server application programs, web services, address book services, messaging services, media services, location-based services, search programs, and the like. The applications may communicate with counterpart applications or services such as web services accessible via a network 126. For example, the applications may represent server-side applications executing in a cloud that corresponds to downloaded client-side services.

The computing device 102 may further include one or more computer executable components. Exemplary components include a communications interface component 114, an application programming interface (API) component 116, a system management component 118, and a toggle feature 128. In this example, components, such as communications interface component 114, API component 116, and the system management component 118 are separate components from application(s) 106. However, in other examples, the communications interface component 114, API component 116, and the system management component 118, are included within the application(s) 106 of the memory area 110.

The API component 116, when executed, causes the processor to process API queries received from a client. The server returns a response to the client via the API component 116. In this non-limiting example, the API component 116 is a representational state transfer (REST) API processing REST API requests. However, the disclosure is not limited to implementation by a REST API.

REST API follows a client-server model, as shown in FIG. 1. REST API is stateless. Each request from a client includes the information for the server to service the request. In other words, the state to handle the request is included within the request itself, whether as part of the URI, query-string parameters, body, or headers.

The uniform resource identifier (URI) uniquely identifies the resource and the body contains the state (or state change) of that resource identified in one or more elements of the request. After the server processes the request, the piece(s) of state data that matter are communicated back to the client via headers, status, and/or the response body.

In REST, the client includes all information needed by the server to fulfill the request within the request message itself. For example, a client may send a GET request specifying one or more properties of one or more instances of an object. An exemplary client request for values of two fields of a POOL object is as follows:

GET https://10.108.49.209/api/types/pool/instances?fields=sizeTotal,sizeUsed.

This GET request includes two properties within a property field parameter, "sizeTotal" and "sizeUsed". This exemplary request may be issued by a client to request the object properties "sizeTotal" and "sizedUsed" for a POOL object. The property "sizeTotal" may represent the total size or total amount of storage associated with the POOL. The property "sizeUsed" may represent the amount of pool storage that has been used.

In some examples, the communications interface component 114 includes a network interface card and/or computer executable program code (e.g., a driver) for operating the network interface card. Communication between the computing device 102 and other devices, such as client 120 and client 122, may occur using any protocol or mechanism over any wired or wireless connection.

In some examples, the user interface component 112 includes a graphics card for displaying data to the user and receiving data from the user. A user may be any one interacting with the user interface component 112. In some examples, the user is a customer. However, the examples are not limited to users that are customers and may include any user.

The user interface component may also include computer executable program code (e.g., a driver) for operating the graphics card. Further, the user interface component 112 may include a display (e.g., a touch screen display or natural user interface) and/or computer executable program code (e.g., a driver) for operating the display.

The system management component 118 may execute within the computing device 102. The system management component 118 optionally parses requests received by the computing device 102 and performs early validation of the requests. In some examples, the system management component 118 may include a feature toggle 128. The feature toggle 128 is a component for identifying one or more features in a plurality of features mapped to one or more elements defined in a REST model. A feature tag identifies a feature mapped to a given element. In some examples, one or more elements are mapped to one or more features.

In other examples, one or more elements associated with an API are always enabled. In such cases, the element is not mapped to any features. The permanently enabled element requires zero features.

In one non-limiting example, a method delete( ) in the REST model may include:
@ FeaturesRequired(HardwarePlatform,BlockStorage)
void delete(storageResource id);
which indicates that to call this delete of a storageResource instance, the delete element requires a hardware platform feature and a block storage feature both be enabled. If either the hardware feature or the block feature is disabled or hidden, the delete element is also disabled. In the above non-limiting example, the tag:
@ FeaturesRequired
is a tag in the model for tagging the features named "HardwarePlatform" and "BlockStorage" to the delete( ) element. This is an example of tagging an element with a list of features. The feature tags are parsed to identify the one or more features mapped to the element, which are required for successful execution or processing of the request.

The feature toggle 128 determines the feature state of the one or more features associated with the element dynamically during runtime based on a plurality of criteria. In some examples, the criteria include, without limitation, licenses, black content, platform, or any other criteria. A feature state may be enabled, disabled or hidden feature state.

The feature toggle 128 enables improved control of API features. The feature toggle 128 may be used to prevent users from using an API and/or prevent users from looking up the code for an API.

The feature toggle 128 is dynamic enough to enable features to be flexibly enabled, disabled, or blocked based on the clients system, the software version or software release, licensing, or any other reason for disabling API relative to a particular user and/or a particular client computing device. In some examples, the feature toggle 128 is built into the operating system (not shown).

The system management component 118 optionally includes a types-feed component 352. The types-fed component is a component for generating responses to types-feed requests in accordance with feature states.

In this example, the computing device 102 is connected via a network 126 to client 120 and client 122. The network 126 may include any type of network connection. In one example, the network 126 may be the Internet, an intranet, an Ethernet, or other wireless or hardwired connections by which the computing device 102 may send and receive data associated with one or more clients, such as, but without limitation, client 120 and/or client 122. However, other examples do not require a network 126.

Client 120 and client 122 represent any computing device executing instructions (e.g., as application programs, operating system functionality, or both) to implement the operations and functionality associated with the computing device. For example, client 120 may include a mobile computing device or any other portable device. In some examples, the mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices. In still other examples, a client is any entity using a REST to communicate with a server or storage system.

In some examples, the client 120 includes one or more processor(s), a memory area, and at least one user interface. The processor includes any quantity of processing units, and is programmed to execute computer executable program code for implementing aspects of the disclosure. The instructions may be performed by the processor or by multiple processors within the client 120, or performed by a processor external to the client 120.

Client 120 stores one or more applications in a client memory area (not shown). The one or more applications may include an API (not shown) for sending page-to-identifier queries to the computing device 102. The API at the client may be a REST API.

Other exemplary client-side applications may include mail application programs, web browsers, calendar application programs, address book application programs, messaging programs, media applications, location-based services, search programs, and the like. The applications may communicate with counterpart applications or services associated with computing device 102, such as web services accessible via the network 126. For example, the applications may represent downloaded client-side applications that correspond to server-side services executing in a cloud.

In the example shown in FIG. 1, the system 100 includes a computing device 102, a network 126, client 120, and client 122. The system 100 may be implemented as a networked data processing system. However, the disclosure is not limited to a networked system including a server and multiple clients, as shown in FIG. 1.

In one example, the client 120 and computing device 102 may be implemented within a single computing device without a network connection. In another example, computing device 102 may be connected via a network to three or more client computing devices.

Figure 2:
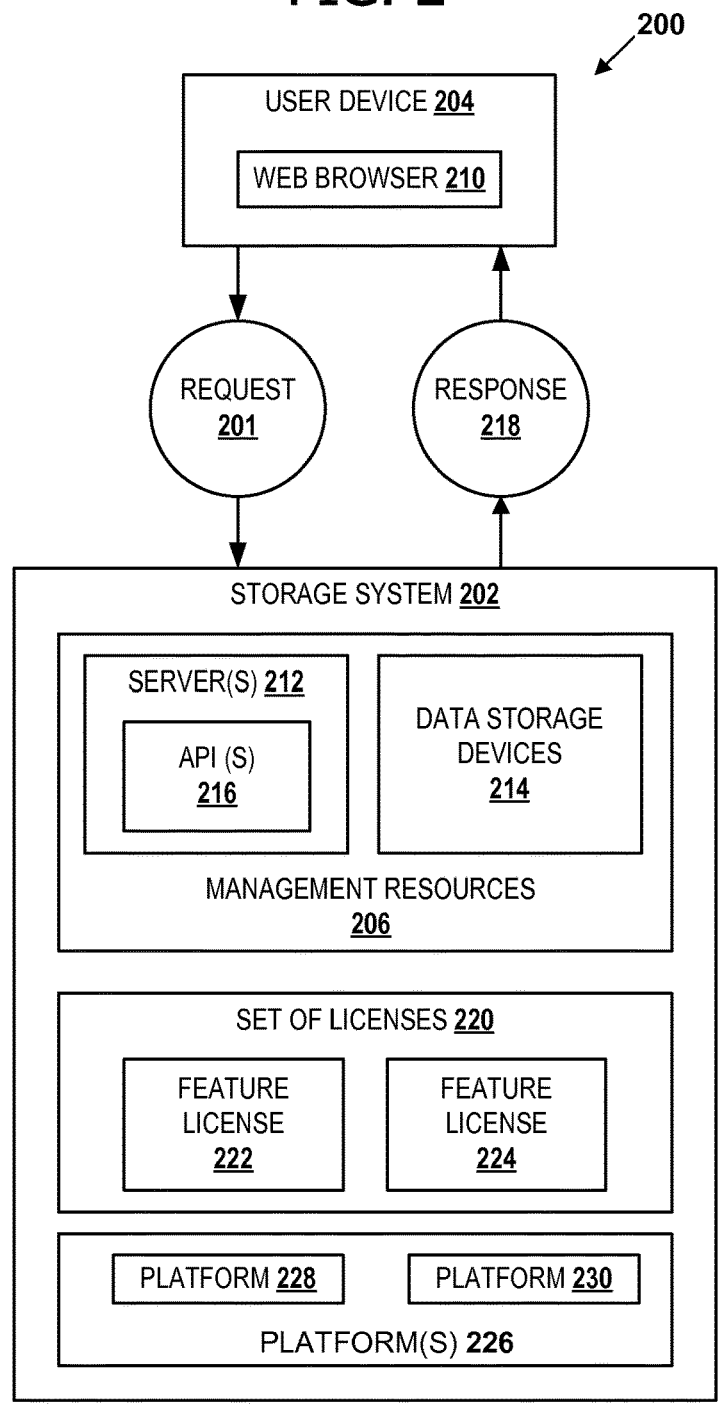
FIG. 2 is an exemplary block diagram illustrating a user device.

Referring now to FIG. 2, an exemplary block diagram illustrates a request associated with a cloud storage system. System 200 is a system for processing requests in accordance with a feature toggle. Request 201 is an API request associated with one or more management resources 206 of storage system 202. In some examples, the storage system 202 is a computing device, such as computing device 102 in FIG. 2. The request 201 specifies a resource associated with one or more elements of the request. The user device 204 generates the request 201. The request 201 may be any type of request.

The user device 204 may be any type of device capable of generating and sending a request and receiving a response 218 from storage system 202, such as, but not limited to, client 120 or client 122 in FIG. 1. For example, the user device 204 may be a desktop computer, a laptop computer, a tablet computer, a smart phone, or any other type of user device.

Storage system 202 is a data storage system including one or more management resources 206. The management resources 206 may include, for example and without limitation, one or more data storage device(s) 214, logical pools, logical units (LUNs), one or more server(s) 212, and any other hardware or software which may be associated with a cloud storage system.

The one or more data storage device(s) 214 include at least one data storage device. In some examples, the one or more data storage device(s) 214 may include a data storage array. A data storage array includes a plurality of data storage devices. The data storage device(s) 214 may also include one or more types of data storage devices, such as, for example, one or more rotating disks drives, optical drives, and/or one or more solid state drives (SSDs), such as, but without limitation, flash drives.

The user device 204 may access storage system 202 resources and services via an application that utilizes the one or more API(s) 208, such as, but not limited to, a cloud storage gateway, a web-based content management system, or a web browser. For example, the web browser 210 may generate and transmit the request 201 to storage system 202 via a web service API.

The one or more server(s) 212 receives the request 201 via one or more API(s) 216. In this non-limiting example, the API(s) 216 includes a REST API. The one or more server(s) 212 performs a preliminary validation of the request based on a set of features associated with one or more elements of the request 201. In some examples, a toggle feature associated with the one or more server(s) 212 performs the preliminary validation on each REST API request by querying the associated feature state of the REST element associated with the request.

If at least one feature state indicates one or more features are disabled or hidden, the request 201 is invalidated and rejected. However, if all the feature states for the set of features required by an element of a request indicate enabled feature states, the request is validated and passed down the API stack for processing. The response 218 to the validated request is generated and returned to the user device 204.

An element state may be disabled if one or more features required by the element are not currently licensed by the user device 204. The set of licenses 220 includes one or more software licenses, such as an end-user license. In this example, the set of licenses 220 includes feature license 222 and 224. However, the set of licenses may include any number of licenses and is not limited to only two licenses as shown in FIG. 2. Thus, if one or more features associated with one or more elements of the request 201 are not licensed, the element state is disabled and the request 201 is rejected.

Multiple different storage system platforms may be supported with the same operating system. In other words, a given operating system release may support one or more platform(s) 226. Each platform may support different features. In one non-limiting example, a given operating system release may support a virtual platform and three (3) hardware platforms, with varying capabilities.

A feature supported by one platform may not be supported by another platform. For example, a virtual platform supports virtual storage features, such as LUNs, file systems, etc. The virtual platform does not support any hardware features like disks, processors, fans, etc. Likewise, a hardware platform, such as, but without limitation supports hardware features such as the disks, fans, etc. In some non-limiting example, the platform 228 is a hardware platform. In these examples, platform 228 does not support file system features.

In other non-limiting examples, platform 230 is a virtual storage platform. In these examples, the platform 230 does not support features associated the fans and other hardware features.

An element state may be disabled if one or more features required by the element are not currently supported by a particular platform of the storage system 202 associated with the request. Thus, if one or more features associated with one or more elements of the request 201 are not supported by a particular platform, the element state is disabled and the request 201 is rejected.

Figure 3:
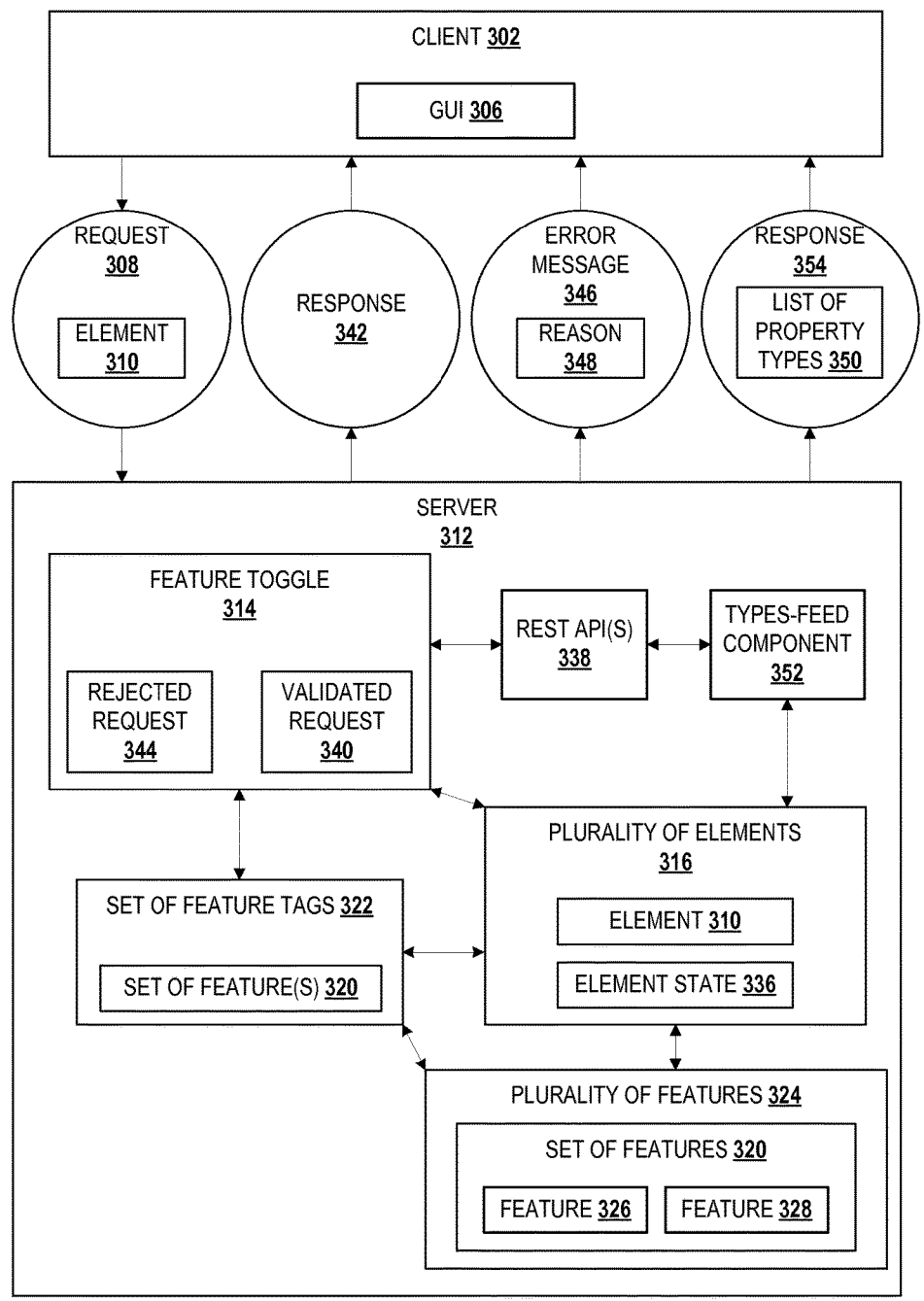
FIG. 3 is an exemplary block diagram illustrating a server responding to REST API requests using feature toggle.

FIG. 3 is an exemplary block diagram illustrating a server responding to REST API requests using feature toggle. Client 302 in this non-limiting example comprising a graphical user interface (GUI) 306. In some examples, the GUI 306 displays an icon, button, or other graphical representation of features that are enabled. In other examples, disabled features may be displayed within the GUI 306 as a grayed out button or icon that cannot be selected or clicked on. In still other examples, hidden features are not displayed within the GUI 306 because hidden features are not visible to users.

In other examples, the client 302 may include a browser or other user interfaces instead of or in addition to GUI 306. The client 302 sends a request 308 including at least one element 310 to a server 312. The request 308 is an API request. In some examples, the request is a request corresponding to a REST API.

A feature toggle 314 performs a preliminary validation on the request 308. The feature toggle 314 parses the request 308 to identify the element 310. The element 310 is an element in a plurality of elements 316 associated with the server 312. In some examples, the feature toggle 314 parses a set of feature tags 322 to identify each feature in a set of features 320 associated with each element. In this example, each feature tag in the set of feature tags 322 identifies at least one feature associated with the element 310 to form the set of features 320. A given feature tag identifies a name of at least one feature.

The element 310 may be any element associated with a request. In one non-limiting example, the element may be a throughput Limit Policy for a storage resource. The Limit Policy is a function for controlling allowed throughput to a resource. In other words, the Limit policy controls an amount of data written to or read from the resource and/or a speed with which data is read from and/or written to the resource.

In another example, an element may be method to create a logical unit (LUN). In still another non-limiting example, an element may be a GET properties query for a particular resource. In still another example, an element may be an allocate pool method.

The feature toggle 314 checks a feature state for each feature in the set of features 320. The feature toggle 314 checks the states dynamically. In other words, the feature state of a feature is determined based on information available at runtime that changes. The feature toggle 314 determines whether each feature is enabled by checking a set of criteria. For example, the feature toggle 314 checks the proper licenses(s), checks the platform hardware, checks the running software version, etc. The feature toggle 314 determines if the feature is enabled, disabled, or hidden based on these criteria checks.

The set of features 320 associated with the element 310 includes one or more features from a plurality of features 324 available on the server 312. For example, a file system element may be associated with a set of file system features. In another example, a LUN element may be associated with a set of block features.

The set of features 320 in this non-limiting example includes feature 326 and feature 328 associated with the element 310. The examples are not limited to two features. The set of features 320 associated with element 310 may include a single feature, as well as three or more features.

The feature toggle 314 checks one or more feature states associated with features 326 and 328 in set of features 320 corresponding to element 310. If all the feature state(s) of features in the set of features 320 associated with element 310 are enabled, the element state 336 is an enabled element state and the request 308 is validated to form a validated request 340. The validated request 340 is processed in accordance with the REST API(s) 338 to generate a response 342. The response 342 is transmitted to the client 302.

If one or more of the feature state(s) include a disabled feature state and/or a hidden feature state, the element state 336 is a disabled element state. If the element state 336 is disabled, the request 308 is invalidated to form a rejected request 344. The REST API(s) 338 returns an error message 346 including a reason 348 for the rejection of the request 308. The reason for the rejection of the request may include, without limitation, one or more unlicensed features and/or one or more features unsupported on the storage system platform. An unlicensed feature is a feature that is not licensed by a user, a client, or other entity. In some examples, the error message 346 is a user friendly message that provides a clear reason why the request is denied.

In some examples, the reason for the error message includes an unsupported feature associated with the element, an unlicensed feature associated with the element, an unrecognized feature, unavailable feature, or other error. For example, if a feature is disabled because it is not supported on a platform, an unsupported feature error may be returned. In another example, if a feature has a hidden feature state, such as when associated with black content, an unrecognized or unknown feature error may be returned. In still another example, if a feature is disabled because it is unlicensed, an unlicensed feature error is returned.

The computing device in this example also supports a types-feed request. A types-feed request indicates a client request for all available property types associated with a particular resource. For example, a types-feed request may be utilized to dynamically ask the computing device what objects are available on the system. In other words, a user may send a types-feed query to ask for a listing of all objects or resources available to be queried by the client. A types-feed request may be used to determine which messages a user can call on one or more objects or resources.

An exemplary types-feed request may include:
GET /api/types/disk.
This types-feed request in this non-limiting example is a GET request for all property types associated with a disk resource that are available and/or supported on the computing device 102. In response, a types-feed component 352 returns a list of property types 350 of the disk resource associated with enabled and disabled features that may be requested by the user in a types-feed response 354. The types-feed response 354 is returned to the client 302.

Types-feed component 352 is a component that processes types-feed requests. The types-feed component 352, in some examples, may be implemented as a component within the feature toggle 314. The types-feed component 352 does not return black content. The types-feed component 352 only returns enabled and disabled content.

Figure 4:
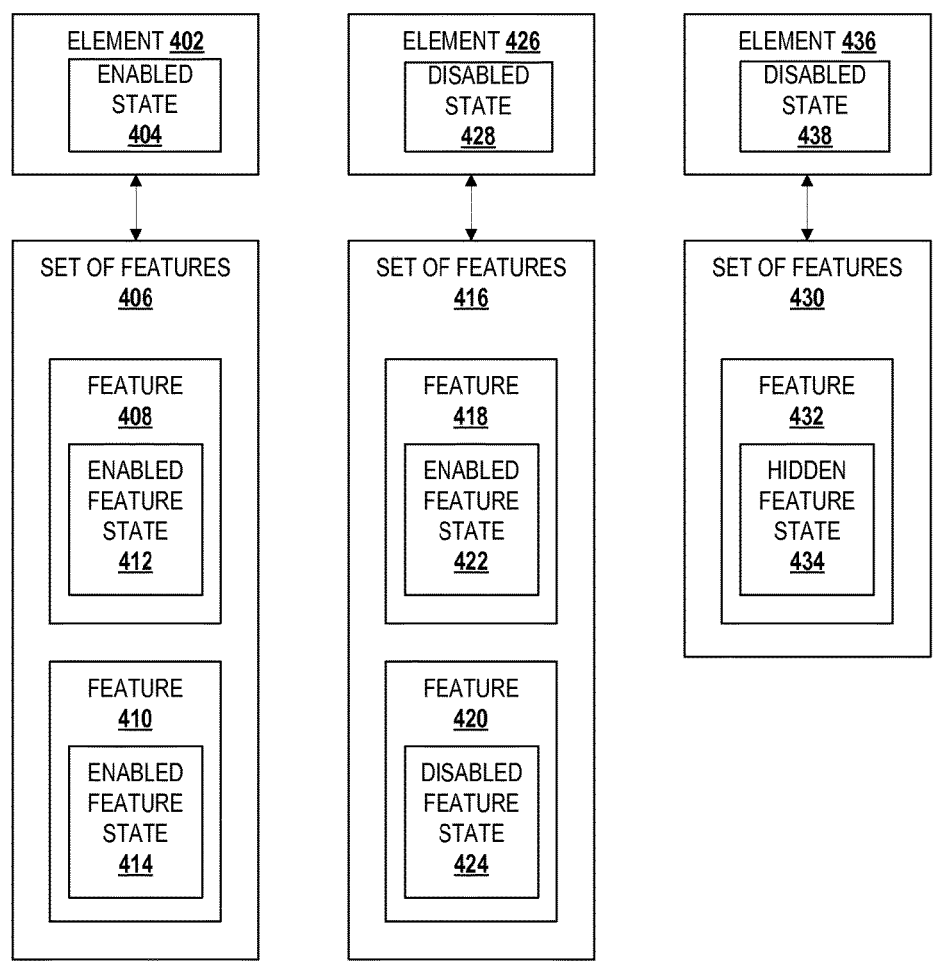
FIG. 4 is an exemplary illustration of a set of element states.

FIG. 4 is an exemplary illustration of a set of element states. An element 402 state is an enabled state 404 if every feature state corresponding to a set of features 406 associated with the element 402 is also enabled. The set of features 406 may include one or more features, such as features 408 and 410.

In one non-limiting example, a feature tag associated with feature 408 is:
FeaturesRequired="BLOCK_DEDUP"
identifying feature 408 as a block de-duplication with hadoop (dedoop) feature. The feature toggle component parses this feature tag to identify the dedoop feature 408. The feature toggle performs a dynamic determination of the feature state of the BLOCK_DEDUP feature 408 to determine whether feature 408 is enabled, disabled, or hidden.

The one or more features mapped to a given element are features required or associated with the given element. For example, feature tag:
FeaturesRequired="QOS_BLOCK"
identifies a quality of service (QOS) Block feature required by a limit policy element.

In this example, the feature state of feature 408 is enabled 412 and the feature state of feature 410 is also enabled 414. Thus, the element 402 has an enabled element state 404.

If a feature 418 within set of features 416 associated with an element has an enabled feature state 422 and another feature 420 within the set of features 416 has a disabled feature state 424, the element 426 has a disabled state 428. In other words, an element state will only be enabled if all feature states associated with the element are also enabled. If one or more element states are disabled, the element state is disabled.

In another example, if a feature 432 within a set of features 430 has a hidden feature state 434, the element 436 state is disabled 438. In other words, if one or more feature states associated with set of features 430 is disabled or hidden, the state of element 436 is also disabled 438. An element disabled due to one or more hidden features associated with the element may be referred to as a hidden element.

In some examples, the hidden element 436 associated with one or more hidden features returns a different error than the disabled element 426. In some examples, the error returned for the disabled element is an error that says one or more features are not licensed or one or more features are unsupported by a particular platform. However, the error returned for a hidden element 436 associated with hidden content does not identify black content or hidden features as a reason for the error. Instead, the error returned for hidden element 436 is the same or similar to an error returned when a non-existent element is requested or when an element name is misspelled in a request.

FIG. 5 is a flow chart illustrating operation of a computing device to process requests based on element states. The process shown in FIG. 5 may be implemented by a computing device, such as, but without limitation, computing device 102 in FIG. 1.

The process begins by receiving a request from a client at 502. The process parses a set of feature tags associated with an element of the request at 504. The process identifies a set of features associated with an element at 506. The set of features may include no features, a single feature, as well as two or more features. In other words, an element may not be associated with any features.

The process determines if there are any feature state(s) at 508. If the set of features is a null set having no features, there are no feature state(s) and the process returns to 502. If there is one or more feature state(s) at 508, the process determines whether an element state is disabled at 510. If the element state is not disabled, the process validates the request at 512 and executes the validated request at 514. The process returns a response to the validated request to the client at 516. The process terminates thereafter.

Returning now to operation 510, if the element state is disabled, the process rejects the request at 518. The process returns an error message to the client including a reason for the rejection at 520 with the process terminating thereafter.

While the operations illustrated in FIG. 5 are described as being performed by a computing device 102, aspects of the disclosure contemplate that performance of the operations by entities other than the computing device 102. For example, a user interface, a web browser, or a cloud service may perform one or more of the operations.

FIG. 6 is a flow chart illustrating an operation for determining a feature state of at least one feature. The process shown in FIG. 6 may be implemented by a computing device, such as, but without limitation, computing device 102 in FIG. 1.

The process begins by mapping an element to a set of features at 602. A feature in the set of features is selected at 606. The process determines whether the selected feature is available at 608. If no, the process sets the feature state of the selected feature to a disabled feature state at 610. The process determines if there is another unselected feature in the set at 612. If no, the process terminates thereafter.

Returning to operation 608, if the selected feature is available, the process determines whether the selected feature is supported on a storage system platform at 614. If no, the feature state is set to disabled at 610. Returning to operation 614, if the selected feature is supported on a given platform, the process determines whether the selected feature is currently licensed by the client at 616. If no, the process sets the feature state to disabled. If the selected feature is licensed at 616, the feature state is set to enabled at 618. The process determines whether an unselected feature is in the set of features at 612. If yes, the process selects a next feature at 620. The process iteratively implements operations 608 through 620 until all features in the set have been selected. If there are no unselected features in the set at 612, the process terminates thereafter.

While the operations illustrated in FIG. 6 are described as being performed by a computing device 102, aspects of the disclosure contemplate that performance of the operations by entities other than the computing device 102. For example, a user interface, a web browser, or a cloud service may perform one or more of the operations.

In some examples, a server includes at least one processor and a memory storage device coupled to the at least one processor. The memory storage device includes a memory area. The memory area stores a system management component. An application programming interface (API) receives a request from a client. The at least one processor executes the system management component to parse a set of feature tags associated with an element identified within the request. The at least one processor executes the system management component to identify a disabled element state on determining at least one feature state of at least one feature in the set of features is a disabled feature state or a hidden feature state. The at least one processor executes the system management component to reject the request on identifying the disabled element state.

In other examples, one or more computer storage media embodies computer executable components. The system management component is executed to cause at least one processor to receive a request via a representational state (REST) application programming interface (API). The request includes at least one element. The at least one element associated with a set of features. The system management component is further executed to cause at least one processor to validate the request on determining the element state is an enabled element state to form a validated request, the validated request is processed to generate a response to the validated request. The system management component is further executed to cause at least one processor to invalidate the request on determining the element state is a disabled element state to form an invalidated request. The invalidated request is rejected and an error message is returned to the client.

At least a portion of the functionality of the various elements in FIG. 5 and FIG. 6 may be performed by other elements in FIG. 1 and FIG. 2, or an entity (e.g., processor, web service, server, application program, computing device, etc.) not shown in FIG. 1 or FIG. 2.

In some examples, the operations illustrated in FIG. 5 and FIG. 6 may be implemented as software instructions encoded on a computer readable medium, in hardware programmed or designed to perform the operations, or both. For example, aspects of the disclosure may be implemented as a system on a chip (SoC) or other circuitry including a plurality of interconnected, electrically conductive elements.

While aspects of the disclosure have been described in terms of various examples with their associated operations, a person skilled in the art would appreciate that a combination of operations from any number of different examples is also within scope of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer executable program code or the specific components or modules illustrated in the figures and described herein. Other examples of the disclosure may include different computer executable program code or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein, but within the scope of aspects of the disclosure, constitute exemplary means for implementing feature toggle with REST API to disable and enable REST API features. For example, the elements illustrated in FIG. 1 and FIG. 2, such as the feature toggle 128 of FIG. 1, when encoded to perform the operations illustrated in FIG. 5, constitute exemplary means for a feature toggle to validate and invalidate requests received from clients. The elements illustrated in FIG. 1 and FIG. 2, and more specifically, the feature toggle 128 in FIG. 1, when encoded to perform the operations illustrated in FIG. 6 constitute exemplary means for parsing a set of feature tags associated with an element of an application programming interface (API) request; exemplary means for identifying a set of features associated with the element based on the set of feature tags; exemplary means for determining an element state of the element based on at least one feature state corresponding to at least one feature from the set of features, the element state comprises an enabled element state or a disabled element state; and exemplary means for rejecting the request on determining the element state is the disabled element state to form a rejected request.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A server comprising: at least one processor;
   a memory storage device coupled to the at least one processor, the memory storage device comprising a memory area, the memory area storing a feature toggle component; and,
   an application programming interface (API), the API receives a request from a client, the at least one processor executes the feature toggle component to:
   identify a set of features associated with an element that is included in the request;
   identify a set of feature states corresponding to the set of features;
   on determining that a feature state of every feature within the set of features is enabled, assigning an enabled element state to the element, wherein the request is validated on determining the element state is the enabled element state;
   on determining that both i) a feature state of at least one feature within the set of features is a hidden feature state, and ii) a feature state of another feature within the set of features is an enabled feature state, assigning a disabled element state to the element, wherein the request is rejected on determining that the element state is the disabled element state; and
   return an error message from the server to the client in response to on determining that the request is rejected, wherein responsive to the disabled element having an associated set of features that includes at least one hidden feature the error message returned to the client indicates i) that the element is non-existent, or ii) that the element is misspelled in the request;
   wherein the error message returned to the client responsive to the disabled element having an associated set of features that includes at least one hidden feature is different from another error message that is returned from the server to the client for a disabled element that is associated with a set of features that includes no hidden features and i) one or more features that are not licensed, or ii) one or more features that are unsupported.

2. The server of claim 1, wherein the at least one processor further executes the feature toggle component to:
   process the request to generate a response to the request on determining the request is validated; and return the response to the client.

3. The server of claim 1, wherein the API is a representational state transfer (REST) API.

4. The server of claim 1, further comprising:
   a types-feed component, wherein the at least one processor executes the types-feed component to:
   receive a types-feed request for a resource, wherein the types-feed request comprises a request for all available property types associated with the resource;
   generate a list of all property types associated with enabled features and disabled features of the resource, wherein the list of all property types excludes property types associated with hidden features of the resource; and
   return the list of all property types to the client.

5. The server of claim 1, further comprising:
   wherein the feature in the feature set corresponding to the at least one feature state that is the hidden feature state is under development.

6. The server of claim 1, wherein the feature toggle is built into an operating system of the server, wherein the operating system of the server supports a plurality of platforms, wherein a first one of the plurality of platforms is a virtual platform that supports a plurality of virtual storage features, wherein a second one of the plurality of platforms is a hardware platform that supports a plurality of hardware features, wherein the request is associated with the virtual platform, and wherein the at least one processor further executes the feature toggle component to:
   assign the disabled element state to the element in response to determining at least one feature state associated with the set of feature tags is the disabled feature state, wherein the feature in the feature set corresponding to the at least one feature state that is the disabled feature state is a hardware feature that is not supported by the virtual platform; and
   transmit an error message from the server to the client in response to determining that the request is rejected, wherein the error message comprises a reason the request is rejected, wherein the reason the request is rejected is unsupported feature.

7. The server of claim 1, wherein the element included in the request comprises a logical unit (LUN);

wherein the set of features associated with the element comprises a set of block features; and wherein the set of block features includes a block de-duplication feature.

8. The server of claim 1, wherein the element included in the request comprises a file system; and wherein the set of features associated with the element comprises a set of file system features.

9. A computer-implemented method executed by one or more processors, the method comprising:

parsing a set of feature tags associated with an element included in an application programming interface (API) request received from a client;

identifying a set of features associated with the element, by the one or more processors, based on the set of feature tags;

determining an element state of the element based on at least one feature state corresponding to at least one feature from the set of features, the element state comprises an enabled element state or a disabled element state, including assigning a disabled element state to the element on determining that both i) a feature state of at least one feature within the set of features is a hidden feature state, and ii) a feature state of another feature within the set of features is an enabled feature state; and rejecting the request on determining that the element state is the disabled element state to form a rejected request and returning an error message associated with the rejected request to the client in response to determining that the request is rejected, wherein responsive to the disabled element having an associated set of features that includes at least one hidden feature the error message returned to the client indicates i) that the element is non-existent, or ii) that the element is misspelled in the request;

wherein the error message returned to the client responsive to the disabled element having an associated set of features that includes at least one hidden feature is different from another error message that is returned from the server to the client for a disabled element that is associated with a set of features that includes no hidden features and i) one or more features that are not licensed, or ii) one or more features that are unsupported.

10. The computer-implemented method of claim 9, further comprising:

validating the request on determining the element state is the enabled element state to form a validated request;

processing the validated response to generate a response to the validated request; and returning the response to the validated request to the client.

11. The computer-implemented method of claim 9, further comprising:

mapping at least one element in a plurality of elements to at least one feature.

12. The computer-implemented method of claim 9, wherein the API is a representational state transfer (REST) API.

13. The computer-implemented method of claim 9, further comprising:

determining a feature state of a feature from the set of features dynamically during runtime, wherein the feature state is one of an enabled feature state, a disabled feature state, or a hidden feature state, and further comprising:

on determining the feature state of every feature within the set of features is enabled, identifying the element state as enabled;

on determining the feature state of at least one feature within the set of features is disabled, identifying the element state as disabled; and on determining the feature state of at least one feature within the set of features is the hidden feature state, identifying the element state as disabled.

14. The computer-implemented method of claim 9, further comprising:

receiving a types-feed request for a resource from the client; generating a list of all property types associated with enabled features and disabled features of the resource to form a response to the types-feed request, wherein the list of all property types excludes property types associated with hidden features of the resource; and returning the response to the client.

15. One or more computer storage media embodying computer executable components, said components comprising a feature toggle component that, when executed, causes at least one processor to:

receive a request from a client via a representational state transfer (REST) application programming interface (API), the request including at least one element, the at least one element associated with a set of feature tags, the set of feature tags identifying a set of features associated with the element;

identify an element state based on a set of feature states corresponding to the set of features, including assigning a disabled element state to the element on determining that both i) a feature state of at least one feature within the set of features is a hidden feature state, and ii) a feature state of another feature within the set of features is an enabled feature state;

validate the request on determining the element state is an enabled element state to form a validated request;

execute the validated request;

invalidate the request on determining the element state is a disabled element state to form an invalidated request;

reject the invalidated request; and return an error message to the client in response to on determining that the request is rejected, wherein responsive to the disabled element having an associated set of features that includes at least one hidden feature the error message returned to the client indicates i) that the element is non-existent, or ii) that the element is misspelled in the request;

wherein the error message returned to the client responsive to the disabled element having an associated set of features that includes at least one hidden feature is different from another error message that is returned from the server to the client for a disabled element that is associated with a set of features that includes no hidden features and i) one or more features that are not licensed, or ii) one or more features that are unsupported.

16. The computer storage media of claim 15, wherein the feature toggle component is further executed to cause the at least one processor to:

map every element in a plurality of elements to at least one feature within the set of features.

17. The computer storage media of claim 15, wherein the feature toggle component is further executed to cause the at least one processor to:

identify the element state as the enabled element state on determining that all feature states associated with the set of feature tags are enabled feature states.

18. The computer storage media of claim 15, wherein the computer executable components further comprise a types-feed component that, when executed in response to receipt of a types-feed request for a resource, the types-feed request comprising a request for all available property types associated with the resource, causes the at least one processor to:

generate a list of all property types associated with enabled features and disabled features of the resource to form a types-feed response, wherein the list of all property types excludes property types associated with hidden features of the resource; and return the types-feed response to the client.

* * * * *